United States Patent
Armaroli et al.

(10) Patent No.: US 7,288,984 B2
(45) Date of Patent: Oct. 30, 2007

(54) CHARGE PUMP GENERATOR AND RELATIVE CONTROL METHOD

(75) Inventors: Diego Armaroli, Mortara (IT); Davide Betta, Casalpusterlengo (IT); Marco Ferrari, Voghera (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 180 days.

(21) Appl. No.: 11/180,481

(22) Filed: Jul. 13, 2005

(65) Prior Publication Data

US 2006/0017491 A1    Jan. 26, 2006

(30) Foreign Application Priority Data

Jul. 15, 2004    (IT)    .......................... VA2004A0029

(51) Int. Cl.
  *G05F 1/575*    (2006.01)
  *H02M 3/18*    (2006.01)
(52) U.S. Cl. ......................................... 327/536; 363/59
(58) Field of Classification Search .................... None
  See application file for complete search history.

(56) References Cited

U.S. PATENT DOCUMENTS

| | | | |
|---|---|---|---|
| 6,392,904 B1* | 5/2002 | Bayer et al. | 363/59 |
| 6,661,683 B2* | 12/2003 | Botker et al. | 363/60 |
| 2002/0105312 A1* | 8/2002 | Knight | 323/312 |
| 2006/0001474 A1* | 1/2006 | Armaroli et al. | 327/536 |

* cited by examiner

*Primary Examiner*—Kenneth B. Wells
*Assistant Examiner*—Terry L. Englund
(74) *Attorney, Agent, or Firm*—Lisa K. Jorgenson; Allen, Dyer, Doppelt, Milbrath & Gilchrist, P.A.

(57) ABSTRACT

The electric charge transferred in a charge transfer phase from the pump capacitor to the tank capacitor is diminished by reducing the amplitude of the voltage swing on the transfer capacitor proportionally to the current to be supplied. This is done by limiting the maximum voltage on the pump capacitor to a certain value. This maximum value is calculated to make the voltage on the transfer capacitor reach a certain minimum voltage at the end of the charge transfer phase. A charge pump generator includes a driving circuit that isolates the pump capacitor when the voltage on it reaches the maximum value.

11 Claims, 2 Drawing Sheets

CHARGE PUMP GENERATOR AND RELATIVE CONTROL METHOD

FIELD OF THE INVENTION

The present invention relates to the field of charge pump generators and more particularly to a method of controlling a charge pump generator and a related charge pump generator with reduced low-frequency noise.

BACKGROUND OF THE INVENTION

Charge pump voltage generators are largely used in many integrated circuits (ICs) for supplying the ICs at a pre-established voltage $V_{NEG}$ that should remain constant as the current absorbed by the load varies. An example of a common charge pump voltage generator is shown in FIG. 1. The output voltage $V_{NEG}$ is regulated via a comparator $C_{OMP}$ that compares it with a stable reference (control) voltage $V_{REF}1$.

The circuit of FIG. 1 has operating phases in which the pump capacitor $C_P$ is charged at a certain supply voltage VDD, alternated with operating phases in which the pump capacitor $C_P$ is coupled in anti-parallel manner to the charge tank capacitor $C_T$, that supplies the electronic circuit with a voltage $V_{NEG}$ of opposite sign in respect to the charge voltage VDD. As long as the voltage $V_{NEG}$ is smaller than the voltage $V_{REF}1$, the pump capacitor $C_P$ remains coupled to the supply voltage VDD. When the voltage $V_{NEG}$ exceeds the reference voltage $V_{REF}1$ the capacitor $C_P$ charges the tank capacitor $C_T$ when the clock signal CK assumes a logically active value, and is charged anew at the supply voltage VDD when the clock signal CK becomes logically null.

In practice, this loop controls the duty cycle at a constant frequency when the charge current is above a certain threshold that depends upon the supply voltage, the on-resistances $R_{ON}$ of the switches SW1 and SW2, the pump capacitance $C_P$ and the delay of the feedback line, constituted by the comparator and by the logic gates. $T_{CK}$ being the period of the clock signal CK, and $Q_{min}$ being the minimum charge transferred from the pump capacitor $C_P$ to the tank capacitor $C_T$, the load $I_{load}$ must absorb a minimum current $I_{min}$ given by the following equation:

$$I_{min} = \frac{Q_{min}}{T_{CK}} \quad (1)$$

to switch the switches SW1 and SW2 at each period of the clock signal CK.

If the current $I_{load}$ is smaller than the value $I_{min}$, the charge transferred in a clock period from the capacitor $C_P$ to the capacitor $C_T$ is larger than that necessary for delivering this current for a clock period. The voltage $V_{NEG}$ does not reach the threshold $V_{REF}$ within the current period and the output of the AND gate remains null for more consecutive clock periods.

This situation is undesirable because it generates switching noise in frequency intervals that should be as free as possible from noise for a correct operation of circuits supplied by the charge pump. Indeed, the switches SW1 and SW2 generate switching noise centered around the frequency of the clock signal, when they switch at each period of the clock signal CK, and at a smaller and smaller frequency if they do not switch for more consecutive clock periods. This consequent low frequency noise may disturb sensitive operation of circuits supplied by the charge pump.

The published patent application US 2002/0105312 to Texas Instruments Inc. discloses a charge pump regulator with adjustable output current. In this device, the charging of the tank capacitor is regulated via switches with different on-resistances. A drawback of this approach is that the switches with low on-resistance occupy a relatively large silicon area.

SUMMARY OF THE INVENTION

This invention provides a method of controlling a charge pump generator and a relative charge pump generator with a reduced low frequency switching noise and a reduced silicon area consumption.

According to the method of this invention, the electric charge transferred in a charge transfer phase from the pump capacitor to the tank capacitor is diminished by reducing the amplitude of the voltage swing on the transfer capacitor proportionally to the current to be supplied. Preferably, this is done by limiting the maximum voltage on the pump capacitor to a certain value. This maximum value is calculated such to make the voltage on the transfer capacitor reach a certain minimum voltage at the end of the charge transfer phase.

The method of this invention is implemented in a charge pump generator having a driving circuit that isolates the pump capacitor when the voltage on it reaches the maximum value. In so doing, the above mentioned problems of low-frequency switching noise are overcome without realizing switches of very low on-resistance, that require a relatively large silicon area.

DETAILED DESCRIPTION OF THE PREFERRED EMBODIMENTS

Figure 1:
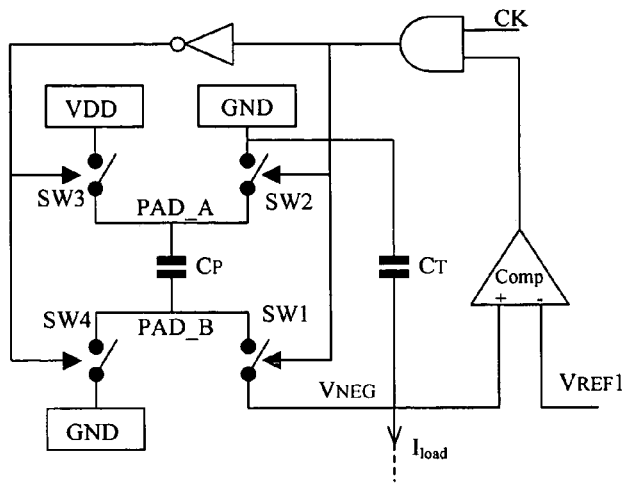
FIG. 1 is a schematic diagram illustrating a charge pump generator in accordance with the prior art.

To center the noise generated by the switches SW1 and SW2 at the frequency of the clock signal CK, the switches are switched at each clock period. As a consequence, if the current $I_{load}$ absorbed by the load supplied by the charge pump generator diminishes, it is necessary to also diminish the value $I_{min}$. This may be done only by reducing the minimum charge transferred from the pump capacitor $C_P$ to the tank capacitor $C_T$ proportionally to the current $I_{load}$ absorbed by the circuit supplied by the charge pump, because the period $T_{CK}$ of the clock signal CK is generally fixed by design specifications.

$Vcp_{START}$ being the voltage on the nodes of the pump capacitor at the instant in which the switches SW1 and SW2 are turned on, $T_{loop}$ being the duration of the time interval in which the switches SW1 and SW2 are turned on in a clock period, $$Q_{min} \cong \frac{Vcp_{START} - |V_{neg}|}{2 \cdot R_{ON}} \cdot T_{loop} \quad (2)$$

and thus $$I_{min} = \frac{Q_{min}}{T_{CK}} \cong \frac{Vcp_{START} - |V_{neg}|}{2 \cdot R_{ON}} \cdot \frac{T_{loop}}{T_{CK}} \quad (3)$$

$R_{ON}$ being the on resistance of the two identical switches SW1 and SW2.

The voltage $V_{NEG}$, as the period $T_{CK}$ of the clock signal, is fixed by design specifications. The ratio $$\frac{T_{loop}}{T_{CK}} \quad (4)$$

may hardly be modified with sufficient precision.

According to the method of this invention, the size of the two switches SW1 and SW2 need not be increased to reduce their on-resistance, as per the prior art approach. According to this invention, the voltage $Vcp_{START}$ is reduced such to make the current $I_{min}$ equal to the current $I_{load}$ absorbed by the load. The charge $Q_{min}$ transferred from the capacitor $C_P$ to the capacitor $C_T$ is $$Q_{min} = Q_{START} - Q_{END} \quad (5)$$

$Q_{START}$ and $Q_{END}$ being the charge on the pump capacitor $C_P$ at the beginning and at the end of the charge transfer phase. By imposing that the minimum current $I_{min}$ be equal to the current absorbed by the load $I_{load}$, the following equation holds:

$$I_{load} = \frac{Q_{START} - Q_{END}}{T_{CK}} \quad (6)$$

Considering that the charge on the pump capacitor is proportional to the voltage on it and that the proportionality factor is the capacitance, $C_P$, the following equation may be written:

$$Vcp_{END} = Vcp_{START} - \frac{I_{load} \cdot T_{CK}}{C_P} \quad (7)$$

wherein $Vcp_{END}$ is the voltage on the pump capacitor at the end of the transfer charge phase. Equation (7), together with equation (3), allows a determination of the values of the maximum and minimum voltage on the capacitor $C_P$ as a function of the current absorbed by the load $I_{load}$ and of the other parameters of the charge pump generator.

Figure 2:
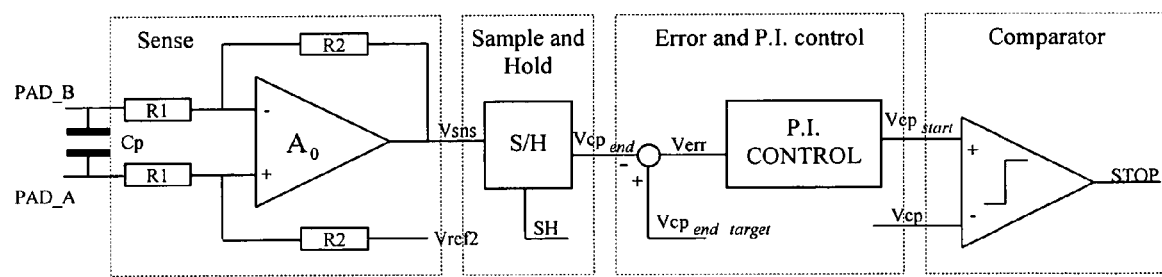
FIG. 2 is a schematic diagram illustrating the control circuit of a charge pump generator in accordance with the present invention.

According to this invention, a control circuit for a charge pump generator for establishing a maximum voltage $Vcp_{START}$ on the pump capacitor $C_P$ is depicted in FIG. 2. The circuit comprises a sensing amplifier (Sense) of the voltage on the pump capacitor that generates a signal $V_{SNS}$ representing this voltage, including an operational amplifier $A_0$, biased by a reference voltage $V_{REF}2$, and the resistors $R_1$ and $R_2$. The signal $V_{SNS}$ is sampled by the circuit "Sample and Hold" S/H when a sample and hold signal S/H is asserted, and a control logic circuit P.I.CONTROL generates a signal corresponding to the value $Vcp_{START}$ as a function of the difference $V_{ERR}$ between the voltage sampled at the end of the charge phase $Vcp_{END}$ and the desired value $Vcp_{ENDtarget}$. Finally, a comparator COMPARATOR compares the voltage Vcp currently on the pump capacitor with the value $Vcp_{START}$, stopping the charging of the capacitor $C_P$ via a logic signal STOP when the voltage on it Vcp reaches the maximum desired voltage $Vcp_{START}$.

When the logic signal STOP is asserted, the switches SW3 and SW4 are turned off and the charging phase of the pump capacitor $C_P$ is stopped. By properly determining the voltage at the beginning of a new charge phase $Vcp_{START}$ according to equation (3), the voltage on the capacitor $C_P$ is exactly $Vcp_{END}$ exactly when the regulated voltage surpasses the reference threshold $V_{REF}1$.

Figure 3:
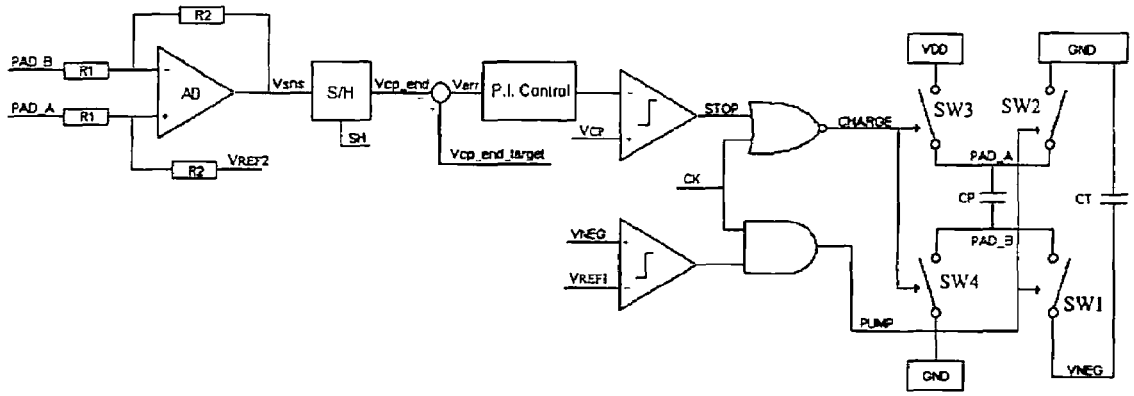
FIG. 3 is a schematic diagram illustrating a charge pump generator of the present invention.

An embodiment of a charge pump generator of this invention, that includes the control circuit of FIG. 2, is shown in FIG. 3. The enabling signal PUMP of the switches SW1 and SW2 is generated as shown in FIG. 1, while the enabling signal CHARGE of the switches SW3 and SW4 is the logic NOR of the signal STOP and of the clock CK. In doing so, the enabling signal CHARGE of the switches that connect the pump capacitor $C_P$ to the supply and to ground is disabled during a charging phase, started with a trailing edge of the clock CK as soon as the signal STOP becomes logically active.

Figure 4:
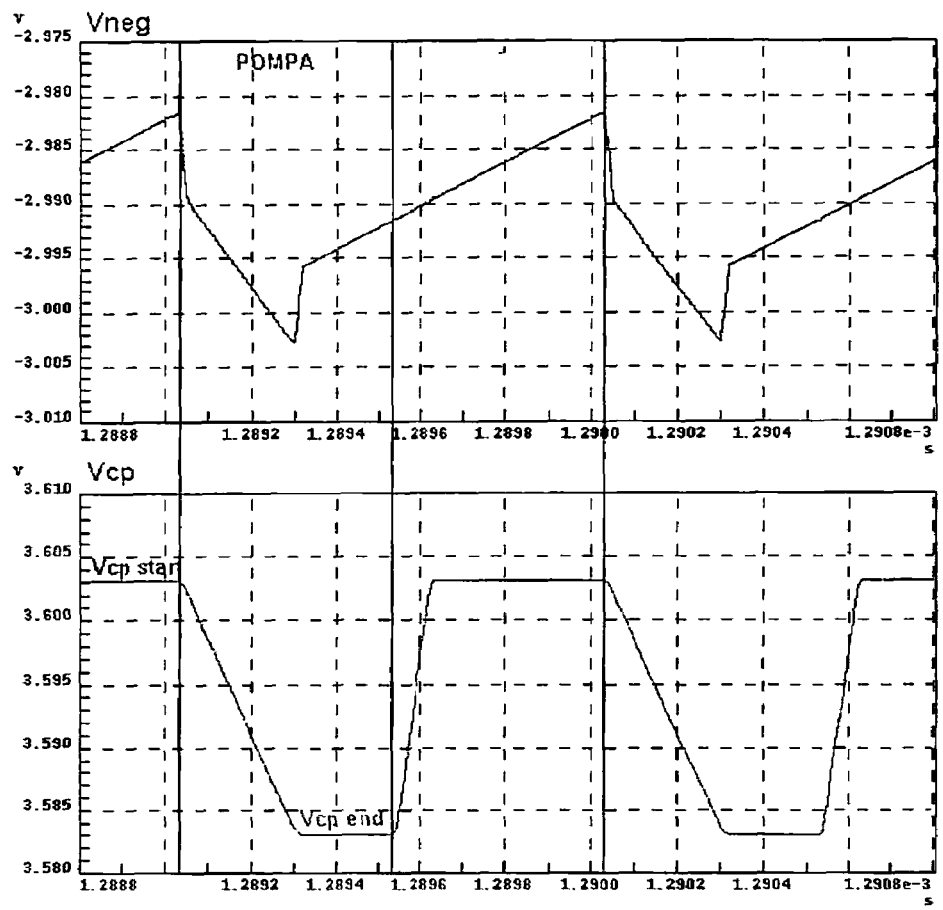
FIG. 4 is a sample graph illustrating the operation of the charge pump generator of FIG. 3.

Results of simulations of the operation of the charge pump generator of the invention depicted in FIG. 3 are shown in FIG. 4. The value of the threshold voltage $V_{REF}1$ of FIG. 1 is set to −3V. When the clock signal switches at each active logic value, a charge transfer phase starts (schematically indicated in FIG. 4 with the label POMPA), the voltage on the capacitor $C_P$ diminishes because it transfers its charge on the tank capacitor $C_T$, and the absolute value of the regulated voltage $V_{NEG}$ increases.

As soon as the regulated voltage becomes smaller than the threshold $V_{REF}1$, set to −3V in the shown example, the comparator COMP of FIG. 1 switches and opens the switches SW1 and SW2. In this case the regulated voltage $V_{NEG}$ is sustained only by the capacitor $C_T$ and thus its absolute value decreases, while the voltage on the pump capacitor equals the voltage $Vcp_{END}$.

When the clock signal CK switches low, a charge phase is started. The regulated voltage is always sustained only by the tank capacitor $C_T$ and thus its absolute value continues diminishing, while the switches SW3 and SW4 are closed and the pump capacitor $C_P$ charges. When the voltage $V_{CP}$ reaches the value $Vcp_{START}$, the control circuit of FIG. 2 of the charge pump generator of this invention opens the switches SW3 and SW4 and stops charging the pump capacitor.

With the charge pump capacitor of this invention, the switching noise generated by the switches SW1 and SW2 remains substantially confined around the clock frequency, where it may be easily filtered without limiting the performances of the circuits supplied by the charge pump and without using purposely made low on-resistance switches, that occupy a relatively large silicon area.

That which is claimed is:

1. A method of controlling a charge pump generator having at least a tank capacitor on which a regulated voltage is generated, and a pump capacitor coupled between a supply line and a ground node during charge phases and coupled in anti-parallel to the tank capacitor during charge transfer phases, the method comprising:
   alternating charging phases of the pump capacitor with charge transfer phases; and reducing an electric charge transferred from the pump capacitor to the tank capacitor during a charge transfer phase proportionally to reductions of an output current, by reducing an amplitude of a voltage swing on the pump capacitor proportionally to the output current.

2. The method of claim 1, wherein the amplitude of the voltage swing is reduced by:
comparing a voltage on the pump capacitor with a first voltage and comparing the regulated voltage with a reference voltage; and
stopping charging phases and charge transfer phases respectively to isolate the pump capacitor when the voltage thereon reaches the first voltage during a charging phase and when the regulated voltage exceeds the reference voltage during a charge transfer phase.

3. The method of claim 2, wherein the amplitude of the voltage swing is reduced by reducing the first voltage proportionally to the output current.

4. The method of claim 2, further comprising:
beginning a charging phase when the regulated voltage on the tank capacitor surpasses the reference voltage and a clock signal of the charge pump generator switches low;
beginning a charge transfer phase when the regulated voltage exceeds the reference voltage and the clock signal switches high; and
setting the first voltage to make the voltage on the pump capacitor reach a second voltage at an end of the charge transfer phase.

5. A method of controlling a charge pump generator comprising a tank capacitor for outputting a regulated voltage, and a pump capacitor coupled between a supply line and a ground node during charge phases and coupled in anti-parallel to the tank capacitor during charge transfer phases, the method comprising:
alternating charging phases of the pump capacitor with charge transfer phases; and
reducing a charge transferred from the pump capacitor to the tank capacitor during a charge transfer phase based upon reductions of a generator output current, by reducing a voltage swing on the pump capacitor based upon the generator output current.

6. The method of claim 5, wherein the voltage swing is reduced by:
comparing a voltage on the pump capacitor with a first voltage and comparing the regulated voltage with a reference voltage; and
isolating the pump capacitor when the voltage thereon reaches the first voltage during a charging phase and when the regulated voltage exceeds the reference voltage during a charge transfer phase.

7. The method of claim 6, wherein the voltage swing is reduced by reducing the first voltage proportionally to the generator output current.

8. The method of claim 6, further comprising:
beginning a charging phase when the regulated voltage on the tank capacitor exceeds the reference voltage and a clock signal of the charge pump generator switches low;
beginning a charge transfer phase when the regulated voltage exceeds the reference voltage and the clock signal switches high; and
setting the first voltage to make the voltage on the pump capacitor reach a second voltage at an end of the charge transfer phase.

9. A charge pump generator comprising:
a tank capacitor to output a regulated voltage;
a pump capacitor coupled between a supply line and a ground node during charging phases and coupled in anti-parallel to said tank capacitor during charge transfer phases alternatingly with the charging phases;
switches connecting said pump capacitor between the supply line and the ground node, and connecting said pump capacitor to the tank capacitor; and
a control circuit generating control signals for said switches to connect said pump capacitor to the supply line and to the ground node during the charging phases, and to connect said pump capacitor in anti-parallel to the tank capacitor during the charge transfer phases;
said control circuit switching said switches to reduce a voltage swing on the pump capacitor based upon a generator output current.

10. The charge pump generator of claim 9, wherein said control circuit comprises:
a logic comparison circuit for comparing a voltage on the pump capacitor with a first voltage and for comparing the regulated voltage with a reference voltage, for generating logic control signals for said switches to isolate the pump capacitor when the voltage thereon reaches the first voltage during the charging phases and when the regulated voltage surpasses the reference voltage during a charge transfer phase, respectively.

11. The charge pump generator of claim 10, wherein said logic comparison circuit comprises:
a comparator to compare the regulated voltage with the reference voltage to generate a logically active comparison signal when the regulated voltage exceeds the reference voltage;
a logic circuit generating a first control signal for a first pair of said switches connecting the pump capacitor in anti-parallel to the tank capacitor based upon the comparison signal and a generator clock signal, and generating a second control signal for a second pair of said switches connecting the pump capacitor between the supply line and the ground node as an inversion of the first control signal;
a detection circuit for detecting the voltage on the pump capacitor, and generating a detection signal based thereon;
a sample/hold circuit being input with the detection signal, generating the first voltage as a function of a second voltage and of the voltage on the pump capacitor at the end of the charge transfer phase;
a second comparator generating a second logic comparison signal when the voltage sensed on the pump capacitor reaches the first voltage; and
the logic circuit including a logic NOR gate input with the second logic comparison signal and the clock signal, and generating the second control signal for the second pair of switches.

* * * * *